Patented Nov. 24, 1925.

1,562,564

UNITED STATES PATENT OFFICE.

ROBERT KATTNER, OF GROCHAU, GERMANY, ASSIGNOR TO FRANKENSTEINER MAGNESITWERKE A. G., OF GROCHAU, GERMANY.

PROCESS FOR BRIQUETTING FUELS.

No Drawing.   Application filed September 19, 1925.   Serial No. 57,465.

*To all whom it may concern:*

Be it known that I, ROBERT KATTNER, citizen of the German Empire, and residing at Grochau, Kreis Frankenstein, Schlesien, Prussia, Germany, have invented certain new and useful Improvements in Processes for Briquetting Fuels, of which the following is a specification.

The invention relates to a process for briquetting fuels, such as coal and the like, in which the binding of the particles of fuels is effected by magnesia cement. In a known process based on this principle the coal is treated with hydrochloric acid and then magnesia, in the form of a powder or converted into a jelly by mixing, is added to the mass. This process possesses the disadvantages generally associated with working with hydrochloric acid gas. Owing to its great chemical affinity hydrochloric acid, as is well known, attacks nearly all metals, so that only vessels and apparatus of special materials can be employed in the process. Moreover, it is impossible, even when taking all precautions, to prevent the hydrochloric acid vapours from passing into the workroom and injuring the health of the workman.

There is also known a process in which coal dust is mixed with calcined magnesia, the mixture is treated with a weak solution of magnesium chloride, and the whole is then moulded and compressed. This process has the disadvantage that the calcined magnesia readily absorbs carbonic acid and water from the air, so that the mixture of coal and magnesia must be worked up as rapidly as possible in order that the magnesia may not lose its cement-forming power and, in addition, a portion of the heat of reaction produced by the absorption of water by the magnesia is lost. Consequently, a store of the mixture of coal and magnesia cannot be kept but freshly prepared small quantities must always be immediately worked up. Again, in the case of this process the setting of the cement has proved to take a relatively long time.

In contradistinction to this, the process according to the invention is carried out by treating the coal dust or the like with ground magnesium chloride and adding the quantity of water necessary for briquetting, the mass being in this way intimately mixed or impregnated with magnesium chloride. The magnesium oxide in the form of calcined and ground magnesia is only added when the mixture is to be moulded and compressed in the known manner and the magnesia cement (magnesium oxychloride) is formed as a binding medium.

By this process the disadvantages mentioned are obviated. The mixture of fuel and magnesium chloride may be kept for any length of time so that it is possible to keep large stores for the preparation of the masses. The heat of reaction is completely utilized for the briquetting, and setting takes place very rapidly. The fuel does not need to be especially finely powdered or ground; the fineness of ordinary coal dust is sufficient.

*Example.*—Amorphous crude magnesite, to which there still cling small portions of serpentine, alumina, lime, silicic acid, etc., is calcined and is then ground to a powder of the fineness corresponding to a sieve of approximately 900 meshes per square centimeter. With this finely ground magnesia, which contains about 70–80% of magnesium oxide capable of setting, there is mixed a mixture of coal dust with about 1% of magnesium chloride (in the form of salt). An addition of 2% of magnesia is sufficient to produce a solid briquette. If the starting materials do not contain sufficient humidity for carrying out the briquetting process the necessary amount of water shoud be added at any suitable stage of the process, for instance by adding the magnesium chloride in solution. The whole mass can then be moulded by hand or by machine and the moulded briquettes can be made still denser by compression. After about 6–8 hours the magnesium chloride will, by its conversion into magnesium oxychloride, have caused the mass to set and the moulded briquettes will be in the form of solid hard pieces ready for transport. The moulded briquettes are weatherproof and hold together even when stored for a long time in the open air; they likewise keep without falling to pieces, even when heated and especially when being burnt, for a much longer time than do other briquettes, so that they are especially suitable for re-heating and serve for storing heat. Danger from the formation of hydrochloric acid is impossible owing to the small chlorine content.

What I claim is:

1. A process for briquetting fuels which consists in first intimately mixing the fuels with magnesium chloride, then adding magnesium oxide and then moulding and compressing the mixture to the desired shape, water being added if necessary.

2. A process for briquetting fuels which consists in first intimately mixing the fuels with magnesium chloride, then adding calcined magnesite and moulding and compressing the mixture to the desired shape, water being added if necessary.

3. A process for briquetting fuels which consists in first intimately mixing coal dust with magnesium chloride, then adding magnesium oxide and then moulding and compressing the mixture to the desired shape, water being added if necessary.

4. A process for briquetting fuels which consists in first intimately mixing coal dust with magnesium chloride, then adding calcined magnesite and moulding and compressing the mixture to the desired shape, water being added if necessary.

5. A process for briquetting fuels which consists in intimately mixing coal dust with about 1% solid magnesium chloride, then adding about 2% of calcined crude magnesite ground to a powder of a fineness corresponding to a sieve of approximately 900 meshes per square centimeter, and moulding and compressing the mixture to the desired shape, water being added if necessary.

ROBERT KATTNER.